Aug. 1, 1950     M. A. BLASINGAME     2,517,173
SAFETY SIGNAL DEVICE FOR VEHICLES
Filed Dec. 17, 1946
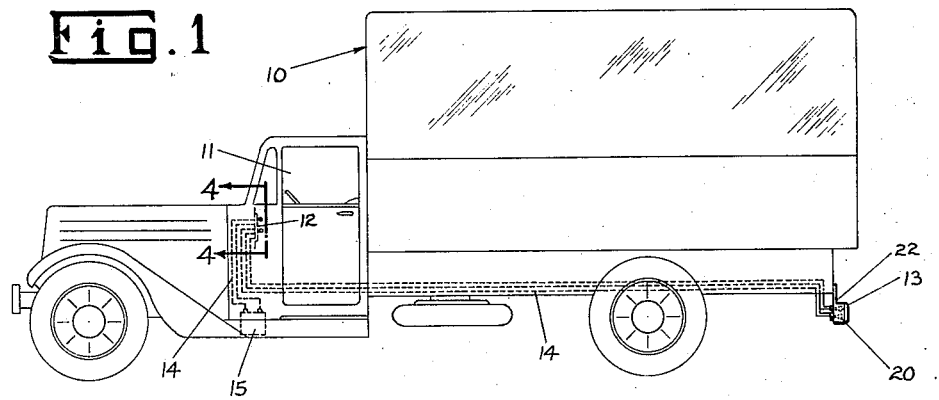
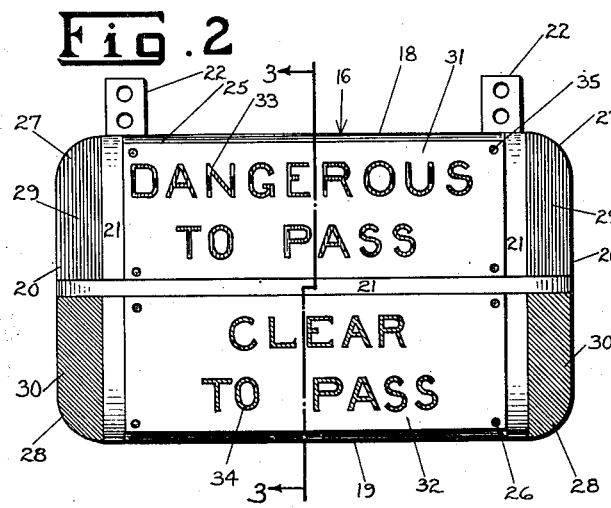
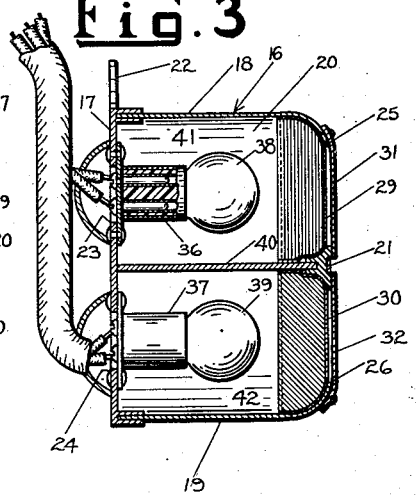
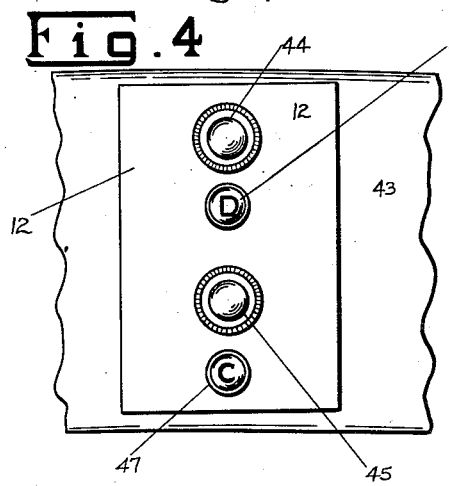
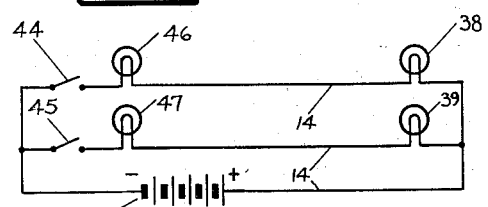
INVENTOR.
MYRON A. BLASINGAME
BY
Huebner, Maltby & Beehler
ATTORNEYS Patented Aug. 1, 1950

2,517,173

UNITED STATES PATENT OFFICE 2,517,173

SAFETY SIGNAL DEVICE FOR VEHICLES

Myron A. Blasingame, Fresno, Calif.

Application December 17, 1946, Serial No. 716,790

2 Claims. (Cl. 177—327)

The present invention relates to signal devices and more particularly to signal lamps for automotive vehicles.

The intermingling of fast and slow automobile and truck traffic on narrow highways has proved exceedingly hazardous largely because of problems of passing. These problems are seriously aggravated when such traffic is impressed on narrow highways in mountainous regions. The temptation for fast moving vehicles to pass slower moving vehicles under conditions of restricted visibility results in many head-on collisions with serious accompanying property damage and loss of life. As a result of these problems, courtesy customs have developed in certain areas wherein the driver of a vehicle desiring to pass a slower moving vehicle, such as a truck, blinks his lights and the driver of the slower moving vehicle blinks his lights in answer when it is safe to pass. This procedure has merit but does not solve the problems. Not all drivers are familiar with this informal procedure. Lights are frequently dimmed or blinked for other purposes. Slow moving vehicles have no positive means for signaling traffic collecting behind it that safe passing conditions prevail. The blinking of lights is of little assistance in the daylight.

An object of my invention is, therefore, to provide a safety signal device expediting the passing of automotive vehicles.

Another object is to reduce accidents incident to the passing of automotive vehicles under conditions of restricted visibility.

Another object is to provide an automotive, safety, signaling device operable by day as well as by night.

Another object is to provide a passing signaling device whose import is obvious even to the most uninstructed driver.

Further objects are to provide improved elements and arrangements thereof in a device of the character and for the purposes set forth.

In the drawings:

Fig. 1 is a side elevation of a truck incorporating the signal device of the present invention.

Fig. 2 is a rear elevation of the signal device as it is seen from the rear of the truck.

Fig. 3 is a section taken on line 3—3 of Fig. 2.

Fig. 4 is an elevation of the control panel forming a part of the signal device as taken on line 4—4 of Fig. 1.

Fig. 5 is a schematic diagram of the circuit embodied in the signal device.

Referring in greater detail to the drawings:

In Fig. 1, a truck 10, having a driving compartment 11, is shown in light line construction. A control panel 12, presently more fully described, is mounted in the driving compartment where it is conveniently accessible. An illuminable sign 13 is shown mounted at the rear of the truck. Wires 14, indicated in dotted line, communicate between the illuminable sign 13, the control panel 12, and a battery 15, also indicated in dotted line.

In Figs. 2 and 3, the illuminable sign 13 is illustrated in greater detail. A substantially rectangular housing member 16 is provided, having a mounting portion 17, top portion 18, bottom portion 19, end portions 20, and rearwardly disposed portion 21. The mounting portion preferably is provided with flanges 22 extended therefrom for convenience in mounting the housing member on the frame, bed, number plate bracket, or elsewhere, on the truck or other automotive vehicle. The mounting portion also has lamp socket mounting openings 23 and 24 respectively, formed therein. The rearwardly disposed portion 21 has an upper opening 25 and a lower opening 26, preferably rectangular in shape, formed therein. At the junctures of the rearwardly disposed portion and the end portions, upper corner openings 27 and lower corner openings 28 are provided. The upper opening 25 and the upper corner openings 27 are preferably closed with windows 29 of translucent, red material. The lower opening 26 and the lower corner openings 28 are preferably closed with windows 30 of translucent green material. The red window in the upper opening 25 and the green window in the lower opening 26 have masks 31 and 32 respectively, superposed thereon. The upper mask 31 is perforated with signal indicia 33, such as the legend, "Dangerous to Pass." Similarly the lower mask is perforated with signal indicia 34, such as the motto, "Clear to Pass." The masks are conveniently secured by screw-threaded means 35.

Conventional lamp sockets 36 and 37 are mounted in the openings 23 and 24 respectively, inwardly disposed the housing member 16. Suitable lamps 38 and 39 are mounted in the sockets 36 and 37, respectively. To preclude the lamps from illuminating the wrong windows, the housing member is interiorly divided by an opaque partition 40 forming an upper light compartment 41, having red windows only, and a lower light compartment 42 having green windows only.

In Fig. 4, the control panel 12 is illustrated, mounted in the driving compartment 11 of the truck, as on an instrument panel 43, thereof. The panel bears a switch unit individual to each light compartment. A switch unit 44, controlling the illumination of the compartment 41, preferably bears the letter D indicating that the switch relates to the "Dangerous to Pass" signal. A switch unit 45, controlling the illumination of the lower light compartment 42, preferably bears the letter C indicating that the switch relates to the "Clear to Pass" signal. A red pilot lamp 46 is positioned on the panel near the switch unit 44 and is energized whenever the lamp 38 is illuminated. Similarly, a green pilot lamp 47 is positioned on the panel near the switch unit 45 and is energized whenever the lamp 39 is illuminated.

To accomplish the energizing of the lamps in the manner described an electrical circuit, schematically illustrated in Fig. 5, is employed. The battery 15 of the truck is the source of current supply. The switch unit 44, the red pilot lamp 46, and the lamp 38, in the upper light compartment 41, are wired in series across the source of current supply. The switch unit 45, the green pilot lamp 47, and the lamp 39, in the lower light compartment 42, are also wired in series across the source of current supply. It is obvious that either or both of the lamps 38 and 39 may be flashing, occulting, periodically interrupted in their illumination without departing from the spirit of the invention.

The operation of the device is obvious from the preceding description and will be summarized briefly at this point. When the driver of a vehicle approaching the truck from the rear makes known his desire to pass, as by blinking his lights, sounding his horn, or other conduct; the driver of the truck from his vantage point, observes the condition of on-coming traffic. If it is not safe to pass, he signals the fact by pressing the switch unit 44 and illuminating the upper light compartment 41. This in turn illuminates the perforated motto, "Dangerous to Pass," and warns also by means of the red windows 29. When it becomes safe to pass, the switch unit 44 is released by the truck driver, the switch unit 45 closed, and the lower light compartment 42 illuminated. This, by illuminating the green windows 30 and the motto "Clear to Pass," signals the following vehicle that it is safe to pass. The pilot lamps 46 and 47 indicate to the operator of the signal device the illumination of said device. If either of the lamps 38 or 39 burn out or if their circuits are interrupted, their respective pilot lamps 46 and 47 will fail to be energized.

It is obvious that the operation of the present device depends upon the cooperation of the driver of the truck to achieve its optimum utility. Inasmuch as the safety of the truck and truck driver depend upon safe passing procedure, the requisite cooperation is quite generally forthcoming. This is further borne out by the fact that the present invention was developed by a truck driver in answer to problems incident to truck driving.

The present invention expedites the passing of automotive vehicles, it is conducive to the reduction of highway accidents, it is effectively employed by day as well as by night, and its significance is clear to the most uninstructed driver.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. A safety signal device for automotive vehicles comprising a housing member interiorly positioned to form a pair of light compartments, each of said compartments having a rearwardly disposed opening formed therein, translucent windows for the openings of colors individual to the light compartment, mask means for the windows covering only a portion of each, one of said mask means bearing the translucent indicia "Dangerous to Pass" and the other bearing the translucent indicia "Clear to Pass," lamps mounted within the light compartments, a circuit for the lamp of each compartment including a source of current supply, a pair of manually manipulable switches in said circuits for selectively energizing the lamps in the compartments, and pilot lamps of the same color as the windows energized in response to illumination of their respective windows.

2. A safety signal comprising a housing member interiorly partitioned to form a pair of light compartments, each of the compartments having a unidirectional opening formed therein, a translucent window located over each opening with each window having a distinctive translucent color, mask means located over and covering only a portion of each window, one of the mask means pierced with letters forming "Dangerous to Pass," the other mask means pierced with letters forming "Clear to Pass," a lamp mounted within each compartment, and means for selectively lighting each lamp.

MYRON A. BLASINGAME.

REFERENCES CITED

The following references are of record in the file of this patent:

UNITED STATES PATENTS

| Number | Name | Date |
|---|---|---|
| 1,244,990 | Koch | Oct. 30, 1917 |
| 1,269,261 | Cook | June 11, 1918 |
| 1,301,741 | Raul et al. | Apr. 22, 1919 |
| 1,893,371 | Knowlton | Jan. 3, 1933 |
| 2,044,300 | Heans | June 15, 1936 |
| 2,083,102 | Slough | June 8, 1937 |
| 2,088,370 | Gingras | July 27, 1937 |
| 2,400,655 | Saia | May 21, 1946 |